United States Patent
Hathaway et al.

(10) Patent No.: US 11,916,873 B1
(45) Date of Patent: Feb. 27, 2024

(54) COMPUTERIZED SYSTEM FOR INSERTING MANAGEMENT INFORMATION INTO ELECTRONIC COMMUNICATION SYSTEMS

(71) Applicant: Virtual Connect Technologies, Inc., Greenville, SC (US)

(72) Inventors: Benjamin Hathaway, Greenville, SC (US); David Setzer, Greenville, SC (US)

(73) Assignee: Virtual Connect Technologies, Inc., Greenville, SC (US)

( * ) Notice: Subject to any disclaimer, the term of this patent is extended or adjusted under 35 U.S.C. 154(b) by 0 days.

(21) Appl. No.: 18/362,875

(22) Filed: Jul. 31, 2023

Related U.S. Application Data

(60) Provisional application No. 63/398,132, filed on Aug. 15, 2022, provisional application No. 63/398,137, filed on Aug. 15, 2022, provisional application No. 63/398,127, filed on Aug. 15, 2022, provisional application No. 63/398,142, filed on Aug. 15, 2022.

(51) Int. Cl.
*H04L 9/40* (2022.01)

(52) U.S. Cl.
CPC ...... *H04L 63/0209* (2013.01); *H04L 63/0236* (2013.01); *H04L 63/1483* (2013.01)

(58) Field of Classification Search
CPC ............. H04L 63/0209; H04L 63/0236; H04L 63/1483
See application file for complete search history.

(56) References Cited

U.S. PATENT DOCUMENTS

| | | | |
|---|---|---|---|
| 7,571,214 B2 | 8/2009 | Schiavone | |
| 7,634,810 B2 | 12/2009 | Goodman et al. | |
| 7,865,458 B2 | 1/2011 | Callanan et al. | |
| 8,152,022 B2 | 4/2012 | Nygaard-Petersen | |
| 9,344,394 B2 | 5/2016 | Hardy | |
| 9,501,746 B2 * | 11/2016 | Prakash | H04L 47/62 |
| 9,686,308 B1 | 6/2017 | Srivastava | |

(Continued)

OTHER PUBLICATIONS

David Winder, Microsoft Office 265—Accounts Under Attach—What You Need To Know, CyberSecurity, May 2, 2019 Online (https://www.forbes.com/sites/daveywinder/2019/05/02/microsoft-office-365-accounts-under-attack-what-you-need-to-know/?sh=31cb624a36cd).

(Continued)

*Primary Examiner* — Huan V Doan
(74) *Attorney, Agent, or Firm* — Kim and Lahey Law Firm, LLC; Douglas W. Kim

(57) ABSTRACT

An electronic message analysis and marking system comprising: a gateway computer system in communications with a message transport system adapted to receive an original incoming electronic message from a sender message system prior to the original incoming electronic message extending into a perimeter of a recipient message system, analyze the original incoming electronic message according to a set of warning criteria, and modify the original incoming electronic message to provide a modified incoming electronic message; and, a gatekeep service in communications with the gateway computer system and a recipient's computer service wherein the gatekeeper service is adapted to receive the modified incoming electronic message, retrieve a trigger from the modified incoming electronic message and perform one or more actions according to the trigger.

20 Claims, 5 Drawing Sheets

(56) References Cited

U.S. PATENT DOCUMENTS

| | | |
|---|---|---|
| 9,916,481 B2 | 3/2018 | Fitzgerald |
| 10,181,957 B2 | 1/2019 | Srivastava |
| 10,404,745 B2 | 9/2019 | Verma et al. |
| 10,628,797 B2 | 4/2020 | Shraim |
| 11,019,000 B2 | 5/2021 | Klemm |
| 11,282,074 B2 | 3/2022 | Kassemi |
| 2003/0229672 A1 | 12/2003 | Kohn |
| 2008/0155036 A1* | 6/2008 | Pirzada ................ H04L 51/212 |
| | | 709/206 |
| 2008/0313704 A1 | 12/2008 | Sivaprasad |
| 2019/0260780 A1 | 8/2019 | Dunn |

OTHER PUBLICATIONS

Jason Wise, How Many Phishing Emails Are Sent In 2022? 11+ Statistics, Earthweb, earthweb.com, Jun. 31, 2022.

\* cited by examiner

COMPUTERIZED SYSTEM FOR INSERTING MANAGEMENT INFORMATION INTO ELECTRONIC COMMUNICATION SYSTEMS

RELATED APPLICATIONS

This application claims priority from U.S. Provisional Patent Application 63/398,142 filed Aug. 15, 2022, U.S. Provisional Patent Application 63/398,137 filed Aug. 15, 2022, U.S. Provisional Patent Application 63/398,132 filed Aug. 15, 2022, and U.S. Provisional Patent Application 63/398,127 filed Aug. 15, 2022, each incorporated herein by reference.

BACKGROUND OF THE INVENTION

1) Field of the Invention

This system is directed to a computerized system for management of electronic messages where in the system can associate markers with an electronic message at the perimeter so that actions can be taken according to triggers prior to as well as after the electronic message is delivered to the target electronic message system.

2) Description of the Related Art

The use of electronic message, especially email, is prevalent in today's society. It is estimated that billions of emails are sent per day. Email is being used for several purposes including personal communications, business communications, marketing, advertising, multi-party communications, collaboration, transmitting attachments, document or any other information interactions, and many other uses. Because of its increased use as well as the increase in security risks with modern communications, a system that can assist with the identification of security risks, analysis of weaknesses and the ability to provide recommendations would be desirable.

Email provides the ability to have very fast delivery of information from remote geographic location, can be sent and received 24 hours a day, 365 days a year, can be accessed with any computer system using cloud-based system so that personal devices are not required, are inexpensive and can be a one to one or one to many distribution. However, email is not without its disadvantages. One disadvantage is the sheer volume of emails that are sent and received. Some users find it unmanageable to receive, review and respond to every email on a daily basis. For example, one study found that the number of business emails sent and received per user per day totals 122 emails per day in 2015 and projected to be 126 emails per day in 2019. Further it is reported that 40 emails a day require a response. With this daily volume, the ability to manage emails, review and properly respond is a management task where automation could be a benefit. Unfortunately, this has not been the case as the technology to manage emails has been directed to the electronic message system (e.g., post office) itself.

For example, U.S. Pat. No. 11,019,000 states that it is a system and method for email management through detection and analysis of dynamically variable behavior and activity patterns. This reference purports to aid an email recipient in the management of inbound email by detecting, and configurably responding to, dynamically variable patterns of activity and behavior of the recipient. Unfortunately, this attempt to solve email management issues falls short in that it requires that the electronic message be received in the inbox of the recipient. Further, the recipient must open, review and take some action on the email for the system of this reference to properly operate. Further, the system of this reference relies upon the input from the user to operate.

U.S. Pat. No. 9,344,394 is also an attempt to improve management of email volume. This reference contends that it performs thread-based message prioritization by using metadata that can be extracted from a received electronic message. Again, this system operates on an email message that has already been received by the electronic message system. It seeks to prioritize emails based upon the thread information. U.S. Pat. No. 7,865,458 states that it is a method and system for enforcing rule selection on user email inboxes include an inbox monitor and administrative rules at an email server. Again, the system in this reference requires that the email arrive at the recipient's inbox and the activity of the user with the user's inbox.

Emails also come with security risks, some of the undesirable uses of email addresses by those such as hackers can include phishing attempts, spam, attempts to obtain financial and personal information and other undesirable and even illegal activities. Generally, phishing refers to an attempt to gather private, confidential, or protected information by social engineering which seeks to have potential victims disclose sensitive information under false pretenses. Phishing attacks are usually carried out via communication channels such as email or instant messaging by fraudulent or misleading actors posing as legitimate and trustworthy entities so that the victim "trusts" the bad actor and discloses such information. It is desirable to identify risks that can lead to successful phishing attempts and provide preventive measures so that these attempts can be reduced if not eliminated.

There have been attempts to automatically filter or identify undesirable electronic messages such as shown in United States Patent 9,501,746 which discloses a system related to detecting bad actors who impersonate other people's identity in order to increase the likelihood of recipients opening these bad actors' messages and attachments. This patent states that this undesirable activity is generally referred to as "phishing" and specifically "spear phishing" when the recipient is targeted by the fake sender who is referred to as a "phisher". This patent also states that these phishers send these "fake emails" seeking to increase their likelihood of successfully gaining unauthorized access to confidential data, trade secrets, state secrets, military information, and other information. The motivation of these phishers is typically for financial gain through fraud, identity theft and/or data theft as well as those which wish to disrupt normal operations. Phishing attempts have been associated with private entities as well as being state sponsored and even foreign government themselves. It would be desirable to have a system that can reduce or eliminate the risks of such undesirable activity by intercepting electronic messages prior to the electronic message being received by the recipient.

Once attempt to detect and/or handle targeted attacks is shown in U.S. Pat. Nos. 9,686,308 and 10,181,957 which disclose a system for detecting and/or handling target attacks in an enterprise's email channel. This patent discloses receiving aspects of an incoming electronic messages addressed to a first email account holder, selecting a recipient interaction profile and/or a sender profile from a plurality of predetermined profiles stored in a memory, determining a message trust rating associated with the incoming email message based upon the incoming email message and the selected recipient interaction profile and/or the sender profile; and generating an alert identifying the incoming email message as including a security risk based upon the determined message trust rating. However, these techniques are limited to the message being received by the electronic message system and limited to the relationship between the sender and the recipient. It would be advantageous to have a system that can reduce the risks of such attacks and other security risks so that the email owner's security protection can be increased.

Typically, an attempt to reduce email risks includes an "after-the-fact"designed to react to phishing attempts which is shown in U.S. Pat. No. 7,634,810. This patent discloses a phishing detection module that detects a phishing attack in the communication by determining if the domain of the message source is similar to a known phishing domain, or by detecting suspicious network properties of the domain. This attempt requires that information about the message domain is known allowing bad actors to simply change domains to overcome this system.

Another attempt to detect, prevent and provide notification of phishing attempts is shown in U.S. Pat No. 10,404,745 which discloses the use of natural language techniques and information present in an email (namely the header, links, and text in the body) to detect phishing. This system is limited to an analysis of the email itself and occurs once the phishing attempt or attack has been initiated. It would be advantageous to reduce the ability of a phishing attempt to occur in the first place, rather than an "after-the-fact" solution as in the prior art.

Unfortunately, the historical activities such as subscribing to a spam filter are no longer sufficient and more a sophisticated approach is needed. One strategy is to develop a layered approach which should include preventive measures at the perimeter and not just once the email arrives in the inbox or email system.

Electronic messages, including email, can include header information that is used for various aspects of the management of the email. An email header is a collection of metadata that can include information about the travel path of the email from the origination to the recipient. It can also include information about the email security, the sender, the IP address and other information. The protocols that govern the sending and receipt of emails can be defined by Simple Mail Transfer Protocol, Post Office Protocol and Internet Message Access Protocol that are commonly used. However, each protocol has its limitations so that the ability to provide customization and actions on an email prior to it being received at the email system is limited. Further, the user, using one or more of these protocols, has a limited number of commands that can be accessed.

There have been some attempts to use application programming interfaces to improve the features of an electronic message system such as in U.S. Pat. No. 11,282,074 that states that it is a method for leveraging emails to complete an online transaction from a third-party vendor. This system uses third parties to request two-click payment buttons for inclusion in HTML formatted electronic communications in email so that email can be used for e-commerce. However, the system of this patent expressly uses an application programming interface into the electronic message system itself and does not address electronic messages at the perimeter.

In some implementations, electronic message systems take action, not an email according to its contents and other rules that are based on the email or its header information. What is not present in the prior art is the ability to modify an email message to contain triggers that can be acted upon prior to the electronic message being received in the recipient's inbox or even the electronic message system.

Therefore, it is an object of the system to provide for a system that can review and act on an electronic message at the perimeter.

It is another object of the system to allow for a trigger to be inserted or associated with the message prior to the message being received in the electronic message system.

It is another object of the system to provide for a system that can insert a trigger into an email that can be acted upon prior to or after the electronic message is received by the recipient.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1A:
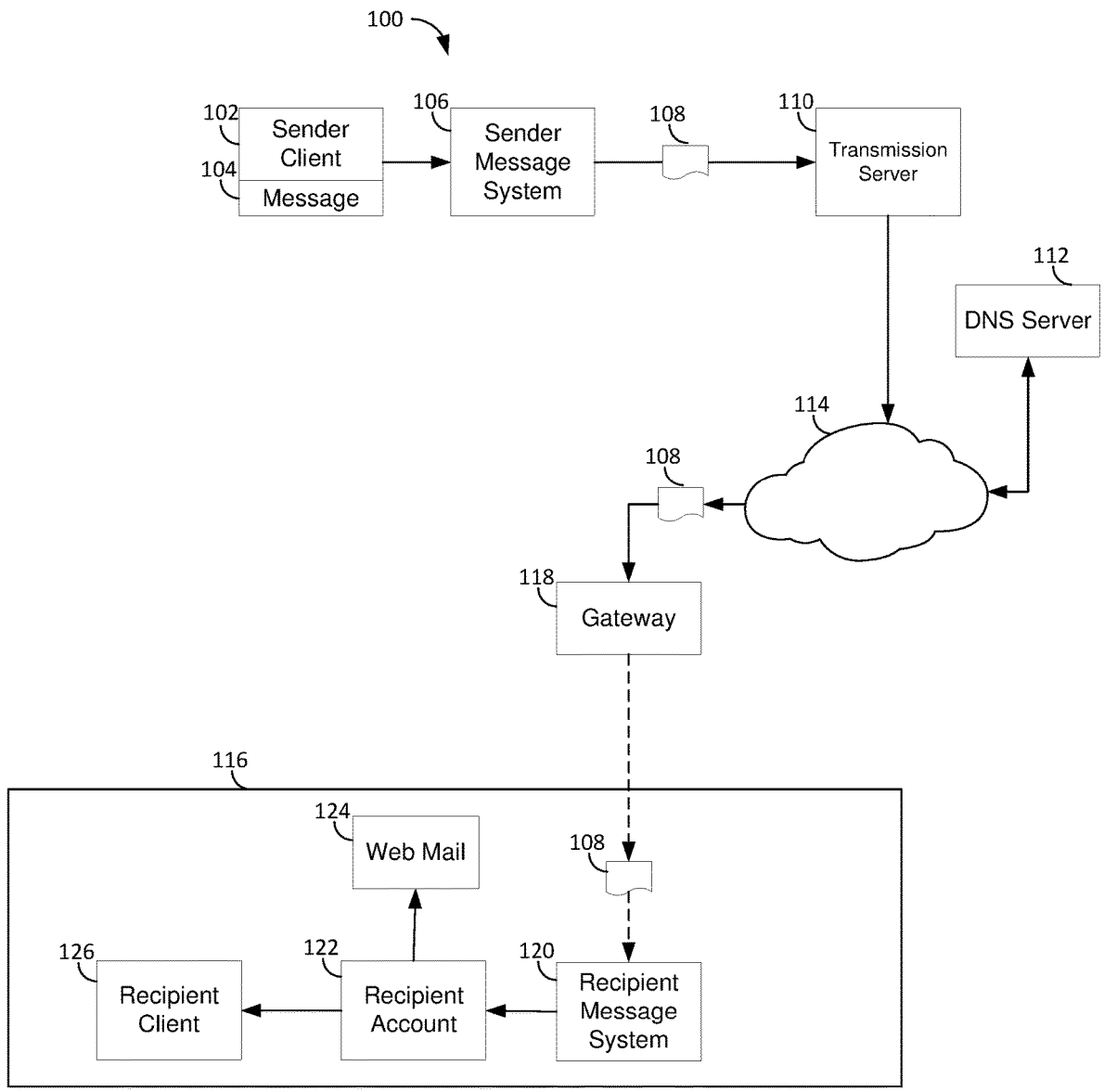
FIG. 1A is a schematic of aspects of the system.
Figure 1B:
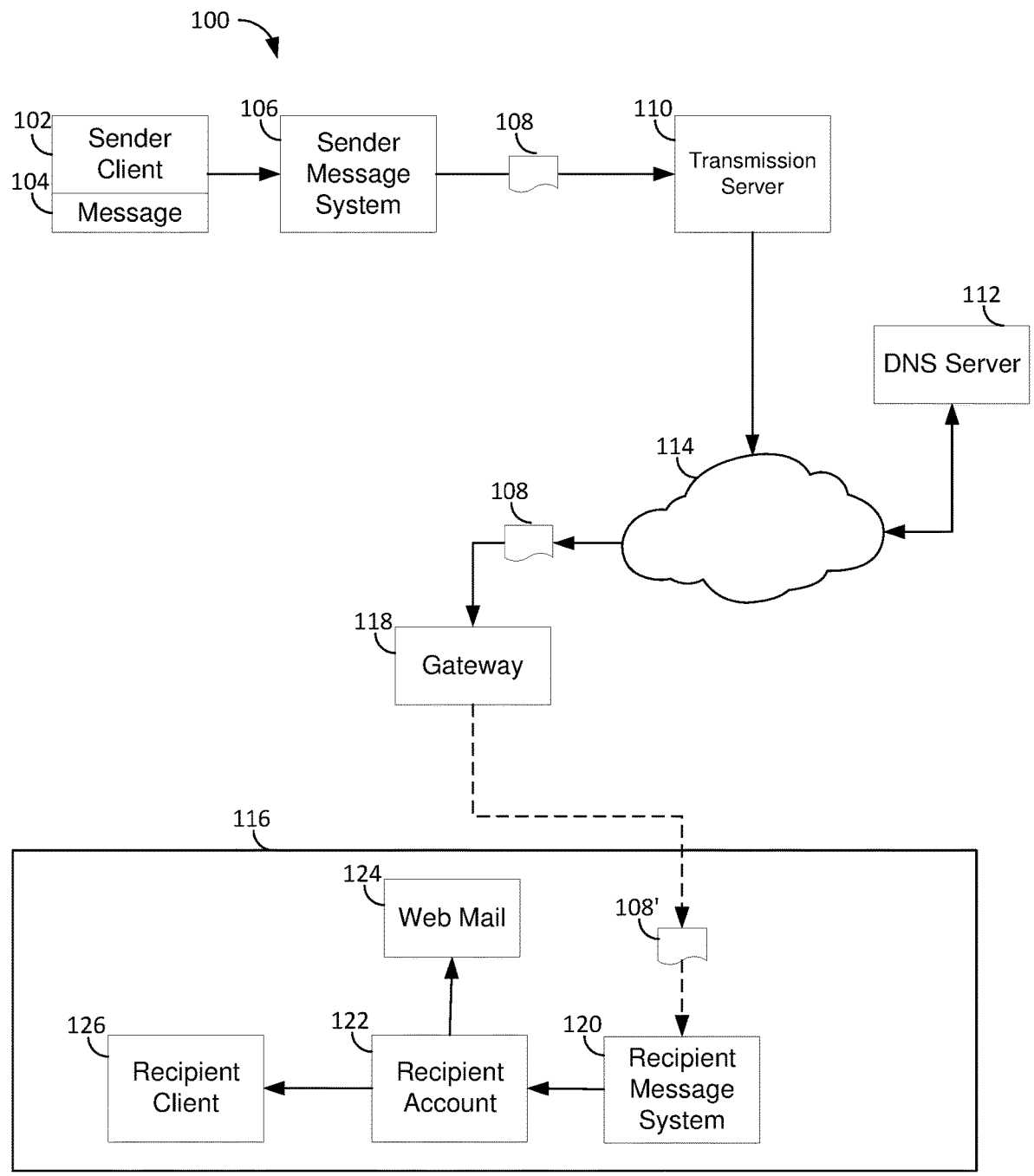
FIG. 1B is a schematic of aspects of the system.
Figure 1C:
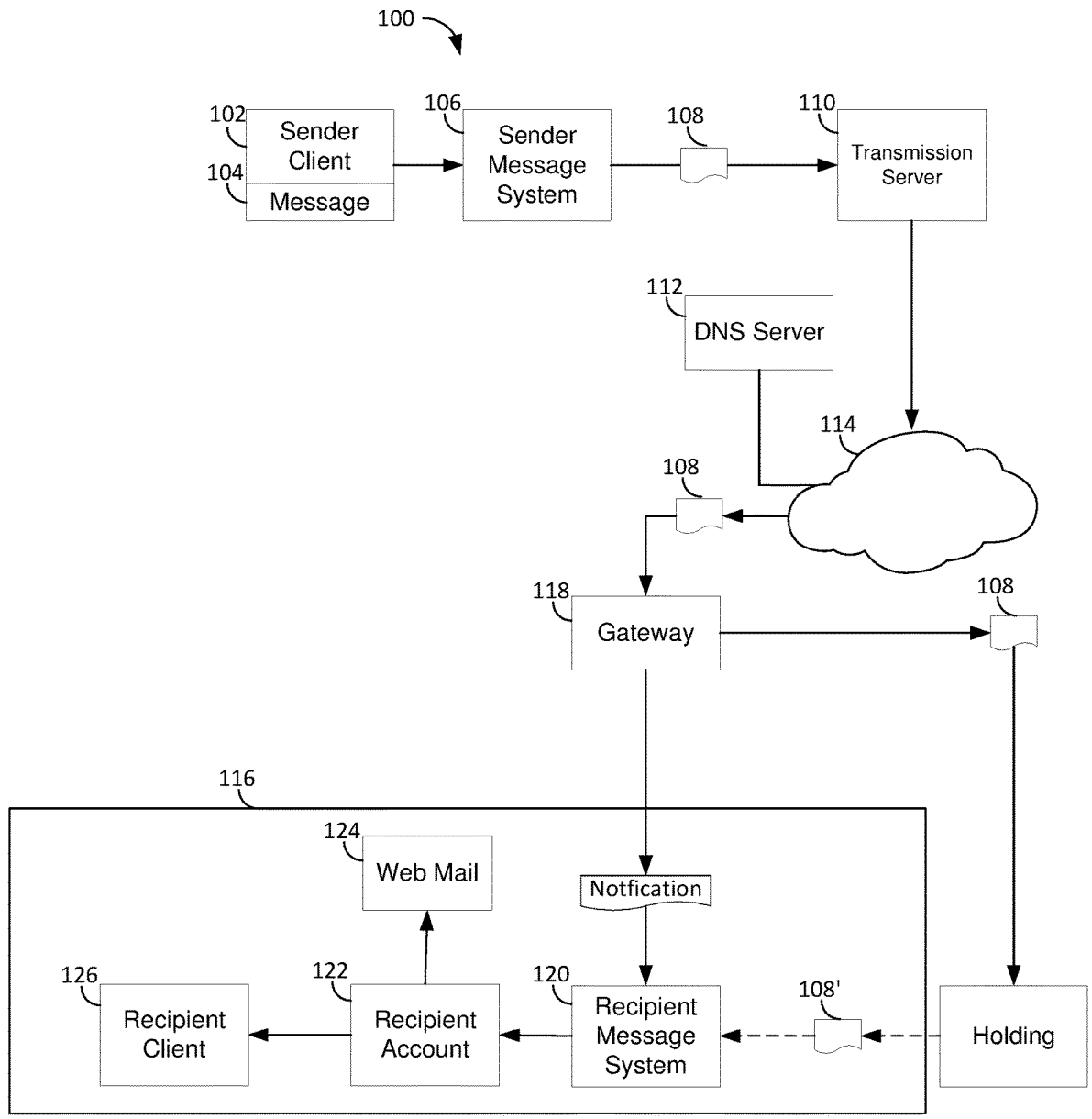
FIG. 1C is a schematic of aspects of the system.

Referring to FIGS. 1A through 1C, and using an email system as an example, a message management system is shown generally as 100. The sender device 102 can be used to create a message 104. The message can be created by an individual author (e.g., human) or an automated system. The sender client can be local, web based, or can be accessed through SaaS (e.g., cloud based). The sender message system 106 can then transmit a message 108 to a transmission server 110, such as a SMTP server, and then directed to a destination by a domain name system (DNS) 112. The DNS can provide information about where to send the electronic message through a global communications network 114. The electronic message can then be transmitted toward a recipient domain 116. Prior to the message arriving at the recipient's message system 120, the message can be intercepted by a gateway service 118. The gateway service is located outside the perimeter of the recipient message system so that these incoming messages may be acted upon prior to arriving at the recipient's message system. By intercepting the incoming message outside the perimeter, the message can be analyzed or otherwise managed thereby reducing or eliminating the risk of a malicious incoming message impacting the recipient's message system.

For example, assume that a bad actor is attempting to use an email having HTML attachment in a phishing attempt. A HTML attachment can be used to redirect users to malicious sites, download files, or to even display phishing forms locally within the browser. Were a user to open such a file, the damage can be done. Determining that there is a risk prior to the malicious attachment being delivered to the recipient's message system is one of the benefits of the present system.

In order to have the incoming message route to gateway computer system 118 prior to entering the perimeter of the recipient's message system 116, MX record can be used so that the electronic message routes to the gateway. This allows the electronic message to be reviewed and action to be taken prior to the message entering the perimeter and especially prior to being received by the recipient's message system and in the recipient's inbox. In one embodiment, the gateway can determine that no action is needed and pass the message to the message to the recipient message system 120 which can then be retrieved by the recipient's account 122 and viewed with an online system 124 or client 126. Other than normal operating routing information, in one embodiment, the message can be transmitted from the gateway past the perimeter unaltered.

When the message is received by the gateway, the computer readable instructions on the gateway system can determine that an edit is needed to the message and modify the message 108 to message 108'. The modification can include modification to the header information and metadata resulting in the modified message 108' and then send the message to the recipient message system.

In one embodiment, the message can be identified as spam, a security risk, or other undesirable status and not sent to the recipient message system. In this case, the message can be transmitted to a holding area 128 such as a quarantine area that can be inside or outside the recipient's message system perimeter. A notification 130 can be sent to the recipient that informs the recipient that the message was intercepted and placed on the holding area. The recipient or the recipient's message system can communicate with the gateway and can provide a release communication representing a request of the recipient or recipient's message system to allow the message to be released from the holding area and transmitted to the recipient's message system. In one embodiment, an action can be taken on the message by the recipient's message system prior to delivering the message to the recipient's message system such as converting the message to text, removing links, removing images and the like designed to reduce the risk of the message including malicious elements. The message can be modified from message 108 to message 108' prior to being sent to the recipient's message system in one embedment.

Figure 2:
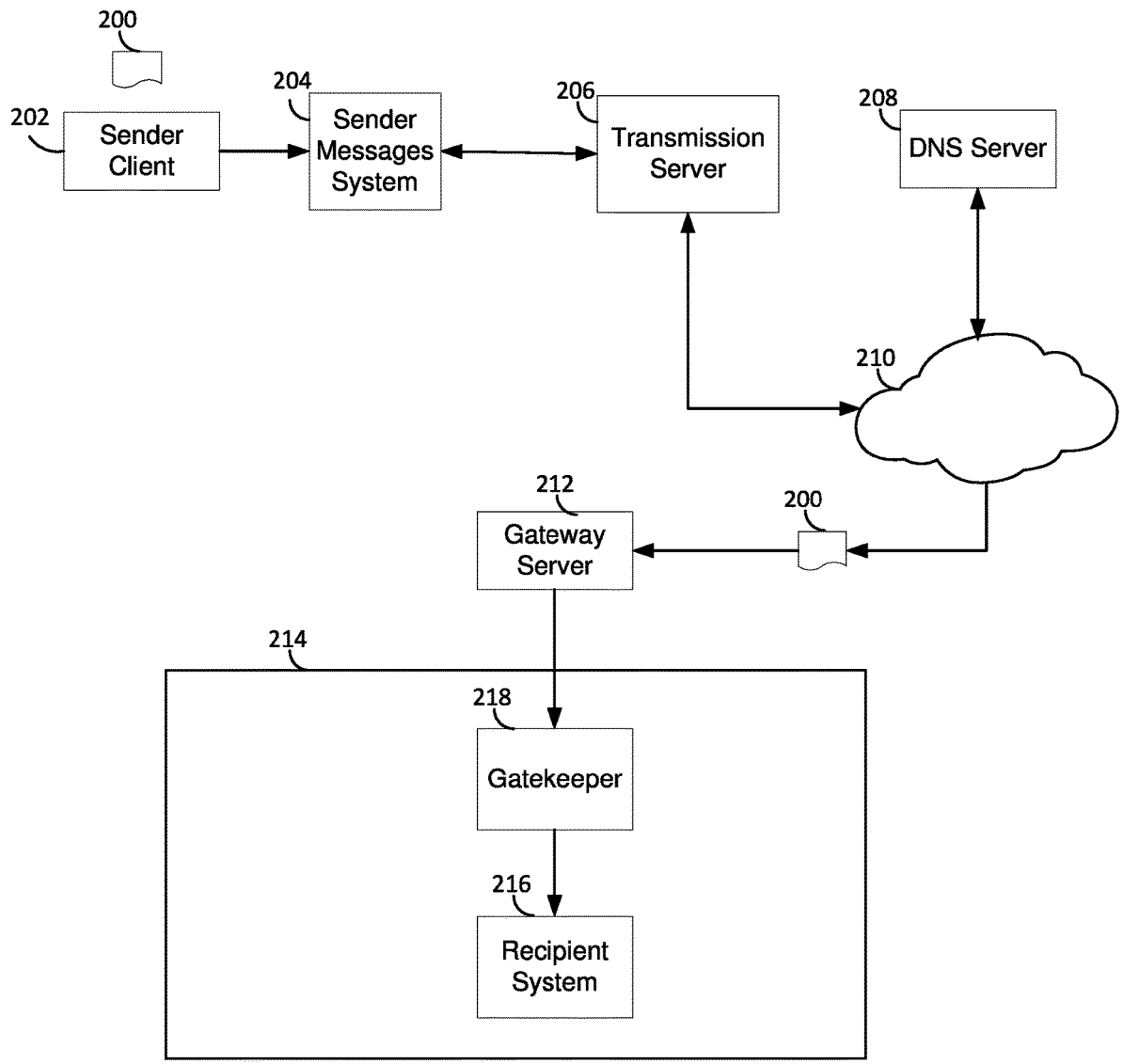
FIG. 2 is a schematic of aspects of the system.

Referring to FIG. 2, message 200, either manually generated or automatically generated, can be created by a sender client 202 that is in communications with a sender message system 204. In one embodiment, the message can be transmitted by the sender message system to one or more transmission servers 206 as in typical with electronic message systems. The header information of message 200 can include information such as the identification of the sender, sender message server, one or more transmissions (or intermediate) servers and the like. Based upon the recipient, a DNS service 208 can determine a route along a communications network 210 for the message 200 to travel including a global communications network. As the message travels, such as with email, the message and its header can have information appended to it including items such as SPF, DKIM and DMARC authentication results, spam filter information, and more. This information can be referred to as "X-headers" and can includes information related to processing of the message and its transmission. Due to the nature of some electronic communications, these systems that add X-headers, can be proprietary systems and may not adhere to industry or even widely accepted standardizations.

The gateway system 212 can use a database or other information to determine what modifications to make to the message that can include indicate spam, indicate malicious sender, indicate attached code or imbedded links, and the like. Each of these could indicate that the message is potentially malicious or should have further analysis. By marking the message, rather than taking action at the gateway level, the performance of the system can be improved as the message can have additional header information added without unnecessary processing or input from the recipient. Further, the gateway system can modify messages that are intended for a domain rather than the specific user.

When the message is intercepted, it can be modified with additional information that is added by gateway system 212 according to pre-determined warning criteria. The message can then be passed into the recipient's perimeter 214 and to the recipient message system 216. The recipient's message system can include a gatekeep service 218 that includes computer readable instructions that allow the gatekeep service to receive the message within the recipient's perimeter 214, analyze the message including any modification to the message, and perform certain actions. The gatekeep service 216 (which from time to time is also referred to as the gatekeeper) can receive the electronic message, retrieve the header information, and make a determination as to the next action to take concerning the electronic message. Therefore, action taken on a message can be determined at the enterprise level as well as the user level.

For example, gatekeep service 218 may determine that the sender is a blocked sender and not deliver the message to the recipient message system 216. The gatekeeper can also determine the IP address of the sender and determine, according to the IP address, what action to take on the electronic message. For example, if the IP address of the sender is associated with a known source of spam, the gateway service could determine not to send the message to the recipient message server. This action can be taken for all messages to users or for only some of the users that have blocked that IP address.

The gateway system 212 can also edit the header information to add triggers according to information, which may include warning criteria, that the gateway service 218 determines is appropriate. The triggers that are placed on the header information could result from any number of determinations of the gatekeeper 212, but since the header information is being modified, the gateway system does not actually have to take action according to the trigger and the trigger is simply associated with the electronic message. The trigger can be associated with the electronic message by editing the header information, adding information to the electronic message subject, adding information to the electronic message contact, adding an attachment and any combination thereof. Therefore, in one embodiment, the gateway system is amending the electronic message, including amending its header information, so that subsequent action could be taken, but does not necessarily have to be taken. This structure provides increased functionality and even security for existing electronic message systems that would not otherwise be possible.

For example, the amended electronic message can be amended to show that the sender's IP address is a known spam source or other undesirable source, and the header information can include information representing such discovery. The gatekeep service 218 can take some action according to the trigger. For example, the recipient message server may place the electronic message into a "junk" folder automatically according to the trigger. The recipient message server does not have to discover the IP address, nor does it have to seek out information concerning the sender's IP address to determine if it is an undesirable source or not.

The gatekeep service (which may, at times, be referred to as the gatekeeper) can be implemented with a recipient's message server using an application programming interface.

During the process of creating the electronic message (e.g., email), transmitting the message and receiving a reply, each message results in header information that can include any number of items. By way of illustration, an email header can include the following:

Received: from
    CY4PR2201MB1384.namprd22.prod.outlook.com
    (2603:10b6:910:6a::22) by
    SN4PR22MB2902.namprd22.prod.outlook.com
    with HTTPS; Tue, 28 Jun 2022 14:55:33 +0000   (1)

Received: from MW2NAMO4FT012.eop-
    NAM04.prod.protection.outlook.com (2603:
    10b6:303:2a:cafe::2) by
    MW3PR06CA0018.outlook.office365.com
    (2603:10b6:303:2a::23) with Microsoft SMTP
    Server (version=TLS1_2,
    cipher=TLS_ECDHE_RSA_WITH_AES_256_GCM_SHA384)
    id 15.20.5373.16 via Frontend Transport; Tue,
    28 Jun 2022 14:55:31 +0000>   (2)

Received: from otransport-12.outbound.emailsrv.net
    (52.1.62.31) by
    MW2NAM04FT012.mail.protection.outlook.com
    (10.13.31.127) with Microsoft SMTP Server
    (version=TLS1_2,
    cipher=TLS_ECDHE_RSA_WITH_AES_256_GCM_SHA384)
    id 15.20.5373.15 via Frontend Transport; Tue,
    28 Jun 2022 14:55:31 +0000   (3)

Received: from NAM10-MW2-obe.outbound.protec-
    tion.outlook.com (mail-
    mw2nam10lp2106.outbound.protection.outlook.com
    [104.47.55.106]) by ogate-3.outbound.emailser-
    vice.io (Postfix) with ESMTPS id
    D2D80A966C for <doug@kimandlahey.com>;
    Tue, 28 Jun 2022 14:55:29 +0000 (UTC)   (4)

DKIM-Signature: v=1; a=rsa-sha256; c=relaxed/re-
    laxed; d=Mailprotector.onmicrosoft.com;
    s=selector2-Mailprotector-onmicrosoft-com;
    h=From:Date:Subject:Message-ID:Content-
    Type:MIME-Version:X-MS-Exchange-Send-
    erADCheck; bh=CN+
    f5XFwlaGaTKhNrulNut5x7oE5mnx3t4xVI+
    4qvkQ=;   (7)

Received: from
    DM4PR19MB5761.namprd19.prod.outlook.com
    (2603:10b6:8:60::17) by
    BN0PR19MB5278.namprd19.prod.outlook.com
    (2603:10b6:408:151::17) with Microsoft SMTP
    Server (version=TLS1_2,
    cipher=TLS_ECDHE_RSA_WITH_AES_256_GCM_SHA384)
    id 15.20.5373.18; Tue, 28 Jun 2022 14:55:26
    +0000   (8)

Received: from
    DM4PR19MB5761.namprd19.prod.outlook.com
    ([fe80::d447:8c8:3b5c:1119]) by
    DM4PR19MB5761.namprd19.prod.outlook.com
    ([fe80::d447:8c8:3b5c:1119%9]) with mapi id
    15.20.5373.018; Tue, 28 Jun 2022 14:55:26
    +0000   (9)

From: Ben Hathaway
    <ben.hathaway@mailprotector.com>

To: Douglas Kim <doug@kimandlahey.com>

CC: David Setzer <david.setzer@mailprotector.com>   (10)

Subject: Re: Radar Patent and Trademark(s)

Thread-Topic: Radar Patent and Trademark(s)

Thread-Index: AQHYiiN1/
    xl9gZsj6EuDAE8S5xw5nq1k0sUAgAAKU4CAAAbpgIAA
    BesA Date: Tue, 28 Jun 2022 14:55:26 +0000   (10)

Message-ID: <4397EC37-3901-4122-AE57-
    28305CF8B2F7@mailprotector.com>

In-Reply-To:

<SN4PR22MB2902782099AD395EA9F4382ED1B89@SN4PR22
    MB2902.namprd22.prod.outlook.com>   (11)

Accept-Language: en-US

Content-Language: en-US

X-MS-Has-Attach:

X-MS-TNEF-Correlator:

Authentication-Results-Original:

dkim=none (message not signed)

headerd=none;

dmarc=none action=none headerfrom=mailprotector.com;

spf=none;

X-Microsoft-Antispam-Message-Info-Original:

zzKZNSEnd7Z8oihwEWwkiQF6Pvi6TIllobQXfo7PWxoDRY9M29
    iCAY3Yr
    P9cnFYiGy0Uf0DB7HPRnb0pAMo8kEIVS7yw1YNCJY9KfD
    uMkpcD5u8T z/gvvN+fXS/liXZZFGMQQ9w/
    GCm4PZBsEQJ7vF2h7wWaMVWdK9BzkW
    5uJMxBqFyRsKeHMDOJmq+
    HdCAfUcQH0qJegXbkoXBFiVqICIL787luOh
    6LGcx3N28FaW/
    WycZIpTKTq54CQjUU99JaMPpdVWfxh7Qz4Zv35CQ3P
    qwgODUGasTYdM9BYxULY1aPyYBtvTKyrkJqOrX/
    6EIEAndqS5MvDKDP 5xBT26zI3vy+E+
    s87XLW5/
    VZNUiIgclqLKQAOYuDYPugHVZG4ENwy97it
    1eEb4Jblz4eu0HXtCRtI9uv40mr3/m/
    YV8iexZtnP21bNUG85n82JVrbBwz7 W6kS/
    g3FVzOSIrFncs1ARF8trPLOiLxIBUQ4NNzSWohQhwRg8cm
    2fPOrz iSv58I/TtA3NWdJ+
    trW8BDJjfuHDzWY/
    bL4vmZhU9h7uNw7fAsmW+sdtniE
    yaKeenYPrOdwBShlbfqQ42vHNag+EH/
    xLjUCBDcZjUICeLelitPBHffoDtca
    GtlVBE2zqkXWvYBJ5tXUrpZ3vG7PdE8ejtv41yNku1Oc2Nrv
    ZIFt2J2/w5Ub
    t80msrQ4VB1X1IPrYFAGjZW8incjFwCXEMjg4oC5+
    UioHpWhk+dq9/v0B
    MgSZhdmknhcVAGW4fxLkd2/ufjMYsc07/P+
    B9qrmT6fuNlv2mkL4KROvs0
    IQwAoq38dyvbmreofMFbrwVizdWArpDGaNnrxqIpllhcLSzp
    OxA4Qiin/AT/r wjFGI+
    y1t9XIMe68iAAqORjrw9zbMG03+
    PBWJ9fFwZdNpZeWeeB+73uH
    dRA8hm1uhiezKsM4PVOUsU=

From an analysis of the information for this email header, it can be seen that the DMARC=none action-none as shown in line (13). This indicates that DMARC is not present and that the gatekeeper (or application programming interface of the functionality of the gatekeeper in the recipient message server) should take no action. This information is designed to be used by a DMARC policy as determines what could be done with a non-compliance electronic message. The limitation on this structure is that the option for a non-compliance electronic message for the DMARC structure is to either take no action, quarantine, or reject the message. When the setting is "quarantined", the electronic message is accepted, and the recipients message system determines what actions to take. Possible actions include sending the electronic message to a spam folder.

The use of the gatekeeper 218 improves the technology since it does not require that the recipient message system that hosts the recipient's mailbox take the action (e.g., that the message is not already in the inbox). The gatekeeper may also temporarily quarantine the message and inform the recipient that the message was quarantined. This allows the recipient to review the message and determine if a further step is needed. The gatekeeper can also treat the message as spam and prevent the message from being received.

The computer readable instructions of the present system can greatly increase the functionality of such technologies as DMARC and provide additional information allowing the recipient's message server to have more sophisticated actions and improve the security of incoming messages. For example, the header information originally can state "DMARC=none action=none". In this case, the gateway service can review the electronic message header and recognize that the sender's IP address is a known spam source and modify the electronic message system to include "DMARC=none action=quarantine". Therefore, when the message is delivered to the gatekeeper, the gatekeeper can act on the trigger (e.g., action=quarantine) and place the message in the spam folder even regardless of the actual DMARC analysis. The gateway service can take advantage of the existing DMARC policies and have modifying incoming electronic messages so that the DMARC polices act on the trigger, even when the DMARC analysis results come in as "none."

The gateway system 212 can also modify the electronic message header with unique information that is generated by the gateway system. For example, the gateway system could add a new line to the header as shown below:

$$\text{reputation=neutral action=none.} \quad (13)$$

Potential values for the reputation can include a numeric value such as 0-100 or a value selected from positive, neutral, and negative. The action value can be any number of information including blocked, spam, high volume, risk, and any combination. Once the electronic message is modified, can be transmitted into the perimeter of the recipient message server.

The recipient message server can be augmented, such as with an Application Programming Interface (API) and can then retrieve the header information and take action according to recipient message server with default functionality or functionality added through the API; e.g., the gatekeeper. For example, if the header information includes "reputation=negative action=spam", the recipient message server can place the electronic message into a spam folder. In another example, if the header information includes "reputation=breach-risk action=delete", the recipient message server delete the message prior to the message being sent to the recipient message server.

Figure 3:
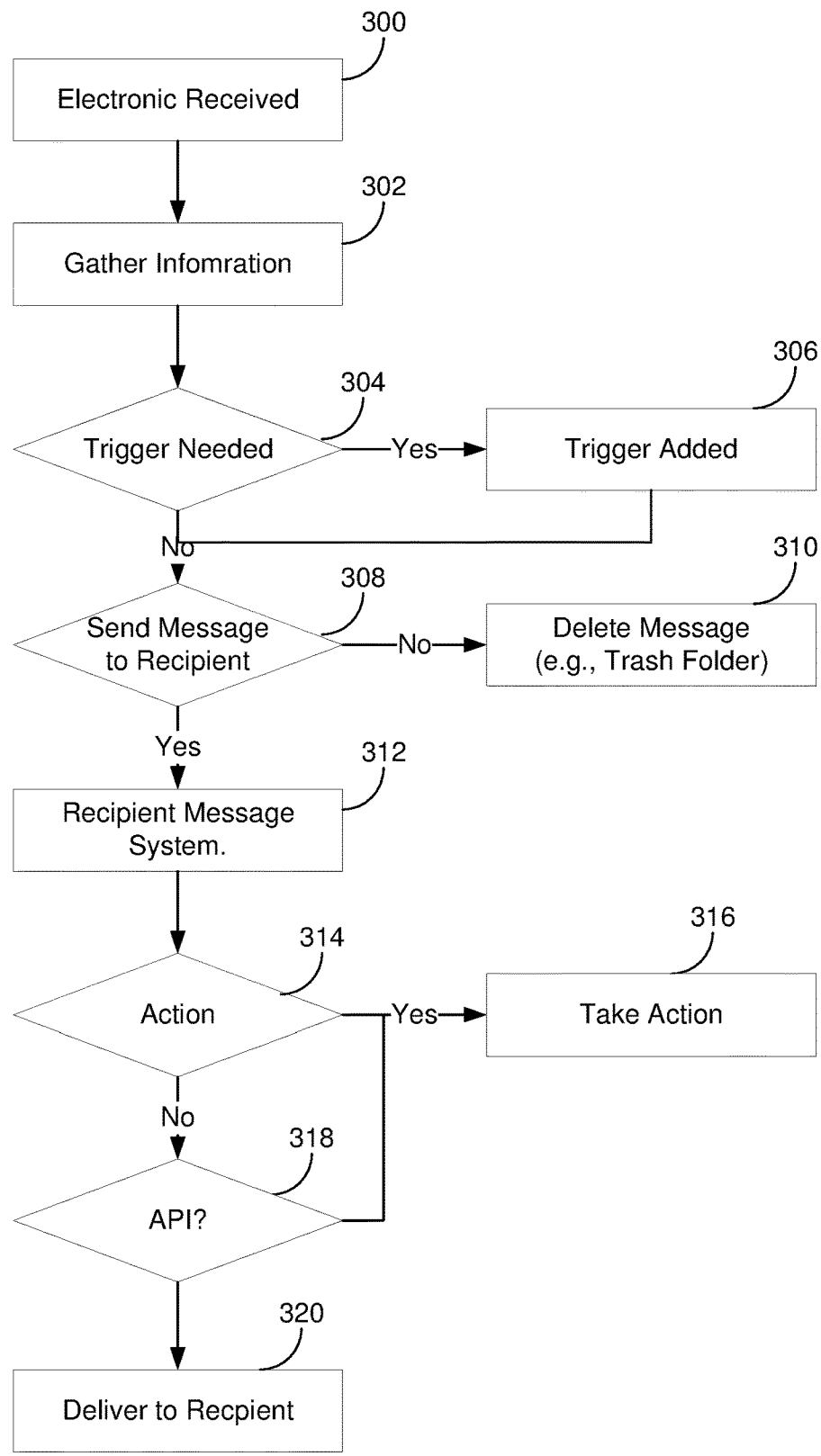
FIG. 3 is a flowchart of aspects of the system.

Referring to FIG. 3, the electronic message can be received at 300 by the gateway service. The gateway system can gather information at 302 about the electronic message and perform analysis on the electronic message that can include a TLS encryption analysis, a MX record exposure, a DKIM presence, a SPF presence, a DMARC presence, a reputational information, a reverse DNS lookup consistency, a tracking item, information concerning other users (e.g., did other users delete, move, not open, open or take other cation on the same or similar electronic message) and any combination thereof and determine what trigger at 304 to modify or add to the message header. The electronic message can be modified at 306 by the gateway service. The gateway system can also determine if the message should be marked to be sent to the recipient message server at 308. Once received, the gatekeep service can determine whether the message should be deleted or otherwise disposed of at 310. The message can be transmitted to the recipient message system at 312. If the message is sent to the recipient message system, the gatekeeper and recipient's message system can determine if action should be taken at 314 according to its current policies and the information associated with the electronic message. If so, the action is taken at 316. A determination at 318 is made whether an API exists and if so, if action should be taken on the electronic message according to the API and the trigger. Action can be taken at 316. The electronic message can be delivered to the recipient at 320.

In determining if the gatekeeper should either take action or the gateway should modify the electronic message (e.g., header), the gateway and gatekeeper can perform any number of analyses. For example, the gateway server can attempt to establish a TLS connection with the sender message system. In establishing these connections, the gateway service can analyze the connection, determine if it is a secure connection and can review the certificate for validity and expiration. If the TLS certificate is missing or expired, the gateway system can modify the electronic message according to indication the results of the analysis. For example, the header information can be amended to have the following:

$$\text{TLS connection=present action=none.} \quad (14)$$

This analysis can also apply to message system access using https and determine if the certificate associated with the https is present and valid.

The gateway system can determine if the "From address", the email or domain, has been blacklisted and modify the electronic message in the event that one or more of the domains in the travel path of the email are blacklisted. The following is an example of header modification.

$$\text{blacklist=true action=delete} \quad (15)$$

From the header information, the gateway system can determine if the DKIM record is aligned or not aligned. In this process, the gateway service can determine if the message is properly cryptographically signed and therefore can provide for authentication of a message. When the DKIM record is missing, the header can be amended to indicate that the DKIM record is missing and what action to take in such an event.

The gateway system can review the SPF record and determine if the SPF record is present and properly configured. In the example above, there is no SPF record and therefore the message header can be modified to so indicate. The SPF record can also be reviewed to determine if there are third party domain that can send emails on behalf of the organization associated with the email being sent.

The gateway system can review the IP associated with the sender's message and retrieve an IP reputation from an internal source associated with the gateway system or from a third-party provider. A negative reputation can result in the message, such as the header information, being modified accordingly. The gateway system can also perform a reverse DNS lookup using the IP address associated with the message. The IP address is used to determine the hostname associated with the sender's message. If there is no pointer record (PTR) then reverse DNS lookup cannot provide the hostname the message can be modified.

The gateway system can also use tracking in the message to determine characteristics associated with the message and any reply, for example, if an email has been opened, when, the location and the type of device that was used to read the email. The message can include a tracking pixel or other tracking item. The message can be modified to add the tracking item to the content of the message of the header can be modified to add tracking information that can trigger the recipient's system to transmit an open message.

In one embodiment, the header information can include a security score. The security score can begin with an initial score and then when each analyzed item is determined, modifications to the security score can be made. For example, Table 1 illustrates potential modification to a security score that can be added to the header information:

TABLE 1

| Analyzed Item | | Deduction (points) |
|---|---|---|
| Received Email With (TLS) Encryption | No | −150 |
| Transmits Email With (TLS) Encryption | No | −150 |
| MX Record Exposes Email Host | Yes | −100 |
| DomainKeys Identified Mail (DKIM) used | No | −100 |
| Sender Policy Framework used | No | −100 |
| Domain/IP Reputation | Negative | −100 |
| Domain-based Message Authentication Reporting and Conformance (DMARC) used | No | −75 |
| Reverse DNS IP matches hostname | No | −50 |
| Spyware allowed | Yes | −25 |

When analyzing TLS encryption, the email address of the sender can include the email domain and a connection can be attempted. The presence of the TLS certificate can be made at 304 and if the TLS certificate is not present, the message can be modified to show that there is no TLS certificate and what action is recommended by the gateway service to the recipient message system. The validity of the certificate can include verification of the digital signature associated with the domain, analysis of the certification chain, including intermediate certificates, review of the expiration or activation dates of the TLS certificate, the revocation status of the certificate and any combination thereof.

The header information can also be used to determent the time that the message is generated, sent, received as well as when a reply is generated, sent and received. The time between these events can be used to determine or analyze the performance of the message system with the longer the time between these events, the less efficient the messages system.

The gateway system can also determine information revealed by the MX record is shown. The domain name associated with the message can be used to retrieve the MX record(s) associated with the domain name. A determination is made if the MX record which, based upon its configuration, exposes the sender's origin IP address and if so, the IP address can be used for determining blocked lists, blacklisted, whitelists, geographic information, and any combination. The message can be analyzed to determine if there is a valid DKIM record. The gateway system can determine if there is a DKIM signature from the email header and if not, modify the message accordingly, such that the DKIM signature is not valid. Therefore, the gatekeeper and recipient message system can take action without having to perform the analysis itself.

The message can be analyzed by the gateway system to determine if there is a SPF record that can be subject to look up and if not, the message can be amended to represent that the SPF record cannot be authenticated. The information revealed by the reverse DNS lookup can be determined by the gateway service. The IP address associated with the message can be determined. If the domain is not a valid domain, then the message can be modified to so indicate. Therefore, determinations and analysis of the message can occur at the perimeter prior to the message being transmitted to the recipient message system.

The gateway system can determine tracking information such as if the message includes a tracking item or that a tracking item has been or should be added. In one embodiment, the tracking information is a tracking pixel or image that can be added to the message email that is sent. The gateway system can determine that the tracking items is present and can take action or provide a trigger in the message for subsequent action (e.g., warning that a tracking pixel is present).

The system described herein is directed to a series of acts that can protect a computer or computer system from electronic communication that may contain malicious code or other undesirable content. The computerized system is one that is at least directed to a process. The system can identify and potentially isolate electronic messages in an electronic message system according to the edge value and/or the confidence values. The edge value and confidence values associated with a sender or electronic message can be stored in a database that can be accessible by a second analytical computer system that does not have to be in direct communications with the first analytical computer system. The processes and procedures that are described herein can be actuated by a computer processor that executes computer readable instructions to provide the functionality herein.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. An electronic message analysis and marking system comprising:
    a gateway computer system in communications with a message transport system adapted to receive an original incoming electronic message from a sender message system prior to the original incoming electronic message extending into a perimeter of a recipient message system, analyze the original incoming electronic message according to a set of warning criteria, and modify the original incoming electronic message to provide a modified incoming electronic message; and, a gatekeep service having computer readable instructions and in communications with the gateway computer system and a recipient's computer service wherein the gatekeeper service is adapted to receive the modified incoming electronic message, retrieve a trigger from the modified incoming electronic message and perform an action according to the trigger taken from the group consisting of: transmitting the modified incoming electronic message to the recipient's message system, placing the modified incoming electronic message in a digital holding area, transmitting a notification that the modified incoming electronic message is placed on a digital holding area, deleting the modified incoming electronic message and any combination thereof.

2. The system of claim 1 wherein the gatekeeper service is outside the perimeter of the recipient's message system.

3. The system of claim 1 wherein modifying the original incoming electronic message includes adding a header to the original incoming electronic message.

4. The system of claim 1 wherein the gatekeeper service is included in the recipient's message system.

5. The system of claim 4 wherein the gatekeeper service acts upon the modified incoming message prior to the modified incoming message being received in a recipient's inbox.

6. The system of claim 1 including a set of blocked IP addresses and, wherein the gateway is adapted to add a trigger to the original incoming electronic message if the IP address of the sender message system matches an entry in the set of blocked IP addresses.

7. The system of claim 1 including a set of blocked sender addresses and wherein the gateway is adapted to add a trigger to the original incoming electronic message if the sender address matches an entry in the set of blocked sender addresses.

8. The system of claim 1 wherein the gateway computer system is adapted to receive the original incoming electronic message prior to the recipient's message system according to an MX record associated with the original incoming electronic message.

9. An electronic message analysis and marking system comprising:
- a gateway computer system in communications with a message transport system adapted to receive an original incoming electronic message from a sender message system prior to the original incoming electronic message extending into a perimeter of a recipient message system, analyze the original incoming electronic message according to a set of warning criteria, and add a trigger to the original incoming electronic message to provide a modified incoming electronic message; and,
- a gatekeep service having computer readable instructions and in communications with the gateway computer system and a recipient's computer service wherein the gatekeeper service is adapted to receive the modified incoming electronic message, retrieve a trigger from the modified incoming electronic message and perform an action according to the trigger.

10. The system of claim 9 wherein the action is taken from the group consisting of: transmitting the modified incoming electronic message to the recipient's message system, placing the modified incoming electronic message in a digital holding area, transmitting a notification that the modified incoming electronic message is placed on a digital holding area, deleting the modified incoming electronic message and any combination thereof.

11. The system of claim 9 wherein the action is transmitting the modified electronic message to a holding area outside the perimeter of the recipient's message system.

12. The system of claim 9 wherein the gateway computer system is adapted to transmit a notification to the recipient's message system representing the modified electronic message is stored in a holding area outside the perimeter of the recipient's message system.

13. The system of claim 9 wherein the gateway computer system is adapted to transmit the modified electronic message to the recipient's message system according to receiving a release communication from the recipient.

14. The system of claim 9 wherein the gateway computer system is adapted to modify an existing field in an existing header of the original incoming electronic message.

15. The system of claim 9 wherein the gateway computer system is adapted to display the modified incoming message to the recipient prior to the modified incoming electronic message being transmitted to the recipient's message system.

16. An electronic message analysis and marking system comprising:
- a gateway computer system in communications with a sender message system and adapted to receive an original incoming message prior to the original incoming electronic message extending into a perimeter of a recipient message system, analyze the original incoming electronic message according to a set of warning criteria, and modify the original incoming electronic message to provide a modified incoming electronic message; and,
- a gatekeep service disposed outside a recipient's message system perimeter and in communications with the gateway computer system and a recipient's computer service wherein the gatekeeper service is adapted to receive the modified incoming electronic message and perform an action on the modified incoming electronic message according to an analysis of the modification to the original incoming electronic message.

17. The system of claim 16 wherein the gateway computer system is adapted to append information to the original incoming electronic message.

18. The system of claim 16 wherein the gateway computer system is adapted to modify information included in the original incoming electronic message taken from a group consisting of DMARC, DKIM, SPF, TLS, and any combination thereof.

19. The system of claim 16 wherein the gateway computer system is adapted to transmit the original incoming electronic message to a holding area outside the perimeter of the recipient's message system.

20. The system of claim 19 wherein the gateway computer system is adapted to transmit a notification representing that the original incoming electronic message is stored on the holding area.

* * * * *